United States Patent
Ecoleston et al.

(10) Patent No.: US 7,111,086 B1
(45) Date of Patent: Sep. 19, 2006

(54) HIGH-SPEED PACKET TRANSFER IN COMPUTER SYSTEMS WITH MULTIPLE INTERFACES

(75) Inventors: Matthew Ecoleston, San Carlos, CA (US); Bich Cau Le, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 1093 days.

(21) Appl. No.: 10/080,782

(22) Filed: Feb. 22, 2002

(51) Int. Cl.
- *G06F 13/00* (2006.01)
- *G06F 13/14* (2006.01)
- *G06F 9/455* (2006.01)
- *G06F 9/46* (2006.01)

(52) U.S. Cl. .................. 710/33; 709/232; 709/238; 710/1; 710/33; 718/1; 718/100; 718/101; 719/232; 719/238

(58) Field of Classification Search ............ None
See application file for complete search history.

(56) References Cited

U.S. PATENT DOCUMENTS

| | | | |
|---|---|---|---|
| 5,740,373 A * | 4/1998 | Isaka ................ | 709/237 |
| 6,438,613 B1 * | 8/2002 | Yeung et al. ....... | 709/250 |
| 2002/0116565 A1 * | 8/2002 | Wang et al. ....... | 710/313 |

* cited by examiner

Primary Examiner—Fritz Fleming
Assistant Examiner—Richard B. Franklin, Jr.
(74) Attorney, Agent, or Firm—Jeffrey Pearce (57) ABSTRACT

An initiating subsystem transfers a data set either in or out in subsets such as packets. Packet transfer is sequential, and transfer of a packet is contingent upon successful transfer of a previous packet. Actual data transfer to or from a destination, over a channel, is handled by a host interface. When an intermediate subsystem, included as an interface between the initiating subsystem and host interface, senses that the initiating subsystem wants to transfer data, it receives a first packet from the initiating system. While continuing to indicate to the initiating system that transfer of the first packet is still pending, thereby causing the initiating system to suspend further packet submission, the intermediate subsystem sends to the host interface information concerning the entire data set to be transferred. When the entire data set is transferred, the intermediate subsystem emulates successful packet-wise transfer to the initiating subsystem. In the preferred embodiment of the invention, the initiating subsystem is a virtual machine, the intermediate subsystem is a virtual machine monitor, and the packets are created according to the USB protocol. Mechanisms are included to detect and correct potential data incoherency that might arise while packet transfer from the initiating subsystem is suspended.

32 Claims, 4 Drawing Sheets

HIGH-SPEED PACKET TRANSFER IN COMPUTER SYSTEMS WITH MULTIPLE INTERFACES

BACKGROUND OF THE INVENTION

1. Field of the Invention

This invention relates in general to data transfer within a computer system, in particular where data is transferred in units such as packets, and especially where the computer includes at least one software-implemented computer such as a virtual machine.

2. Description of the Related Art

Increasing the speed and efficiency of input/output (I/O) operations in computers is a constant goal of developers of both hardware and software. Working against this goal is the tendency of computer systems to increase in complexity, which in turn increases the burden on system software, such as the operating system, that must try to meet the increased demand on I/O subsystems and bandwidth.

One way to maximize the speed of an I/O transfer would of course be for the operating system to devote itself entirely to a current I/O operation, putting all other processes on hold until the transfer is completed. Similarly, an I/O channel, such as a data bus or network, could be devoted entirely to one transfer at a time. Such a dedicated arrangement is impractical, inflexible, and unworkable in modern multi-tasked computer systems. Depending on the type of I/O device involved, such an arrangement might also waste available I/O bandwidth.

In order to increase the flexibility not only of scheduling but also of routing, especially between systems, many I/O operations now operate with basic I/O units that are often referred to as "packets." In this widespread scheme, blocks of data to be transmitted are first converted into a sequence of smaller packets according to a predefined protocol. Each packet may then be transmitted individually. As part of the protocol, additional information (a "header") is therefore typically added to each packet in order to describe characteristics of the data it contains, such as the destination, as well as information to aid in error detection, reassembly of the original data block, etc. The header information, assuming it's included at all, will be determined by the given transfer protocol. Examples of systems that transfer data using packets include the Internet, digital packet-switched telephone networks, and the large variety of Universal Serial Bus (USB) devices.

Figure 1:
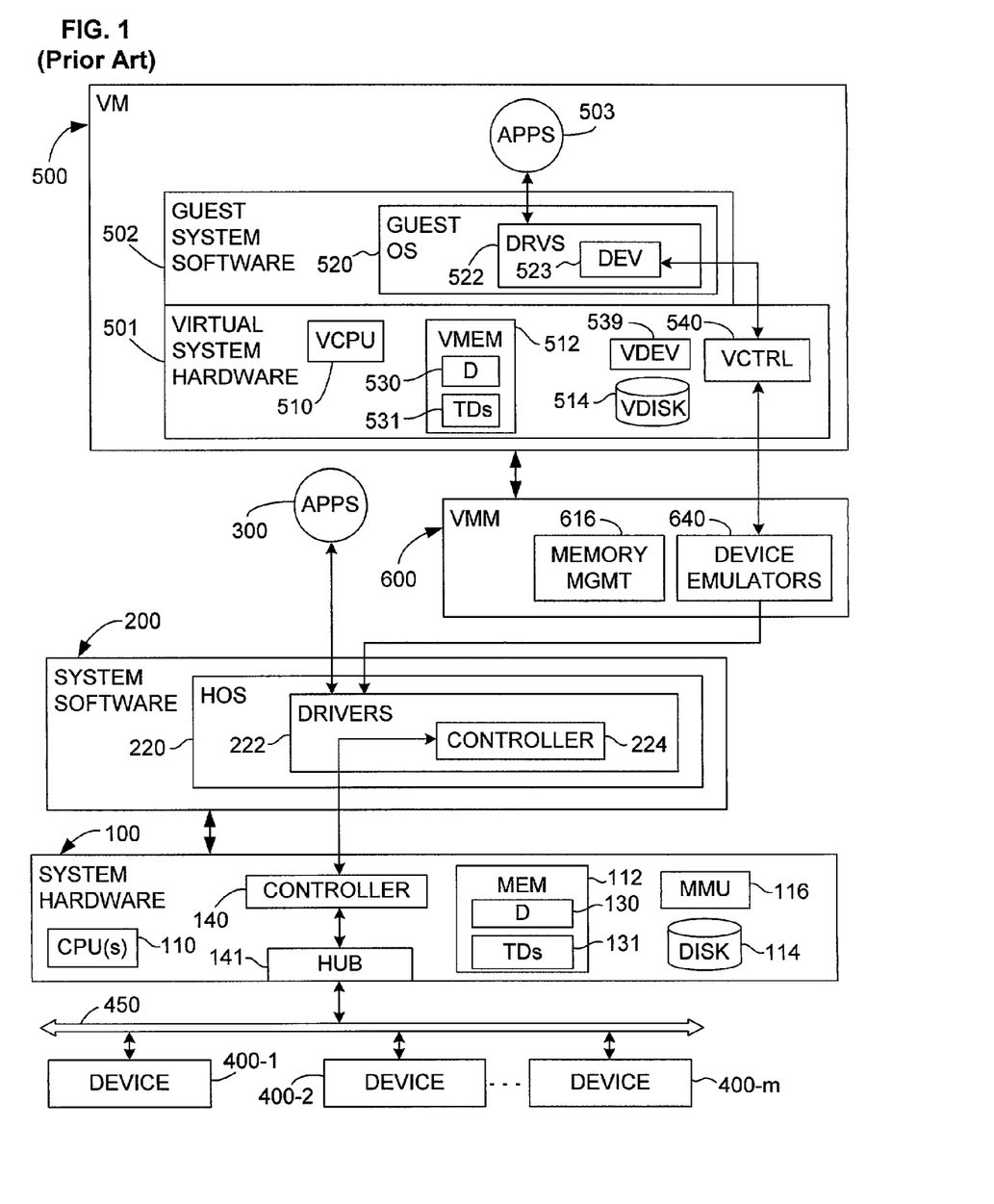
FIG. 1 is a block diagram that shows the main hardware and software components of a prior art computer system that includes at least one virtual machine.

FIG. 1 illustrates the main components of a conventional computer system. System hardware 100 includes one or more central processors CPU(s) 110, which may be a single processor, or two or more cooperating processors in a known multiprocessor arrangement. As in most computers, two different types of data storage are commonly provided: system memory 112, typically implemented using any of the various RAM technologies, and a usually higher-capacity storage device 114 such as one or more disks. The hardware usually also includes, or is connected to, conventional registers, interrupt-handling circuitry, etc., as well as a memory management unit MMU 116, which provides support for such operations as memory tracing. System software 200 either is or at least includes an operating system OS 220, which will include drivers 222 as needed for controlling and communicating with various devices, including the disk 114. Applications 300 are installed to run on the hardware 100 via the system software 200.

FIG. 1 also illustrates various devices 400-1, 400-2, ..., 400-m, which may share and be connected to the rest of the system by a communication channel 450 such as a bus or network. In other cases, individual devices may have dedicated connections to the system hardware 100. It is assumed here that data transfer between the system hardware 100 and each device 400-1, 400-2, ..., 400-m takes place in units such as packets; other types devices may of course also be connected to the hardware 100, both directly and via the network.

For the purpose of data transfer, each device 400-1, 400-2, 400-m will have associated with it at least one communication channel, whether shared or dedicated. Each device may be considered to be a separate "target" or "destination" when it comes to data transfer. A hardware device controller 140 is also typically included for each device, or for each group of devices that share a common channel 450. In FIG. 1, only one such device controller 140 is shown, merely for the sake of simplicity. A driver 224 is also loaded in the operating system in order to support the hardware controller 140.

Assume by way of a very common example that the devices 400-1, 400-2, 400-m are USB devices, so that data transfer over the channel (in USB contexts, a bus) 450 is to take place according to the well known USB protocol. Whenever some "source" sub-system or process, such as an application, initiates a request for transfer of a block of data D to a USB device, that is, an OUT operation, it establishes a memory buffer 130 in which it stores the data D. The source subsystem then generates a corresponding transfer request to indicate to the controller driver 224 that it should begin the procedure (described below) for transferring the data set D. The buffer is also established for data that is to be input from the USB device that is, for an IN operation. Note that, in other systems, according to other protocols, the controller driver 224 may be responsible for establishing the buffer 130.

Figure 2:
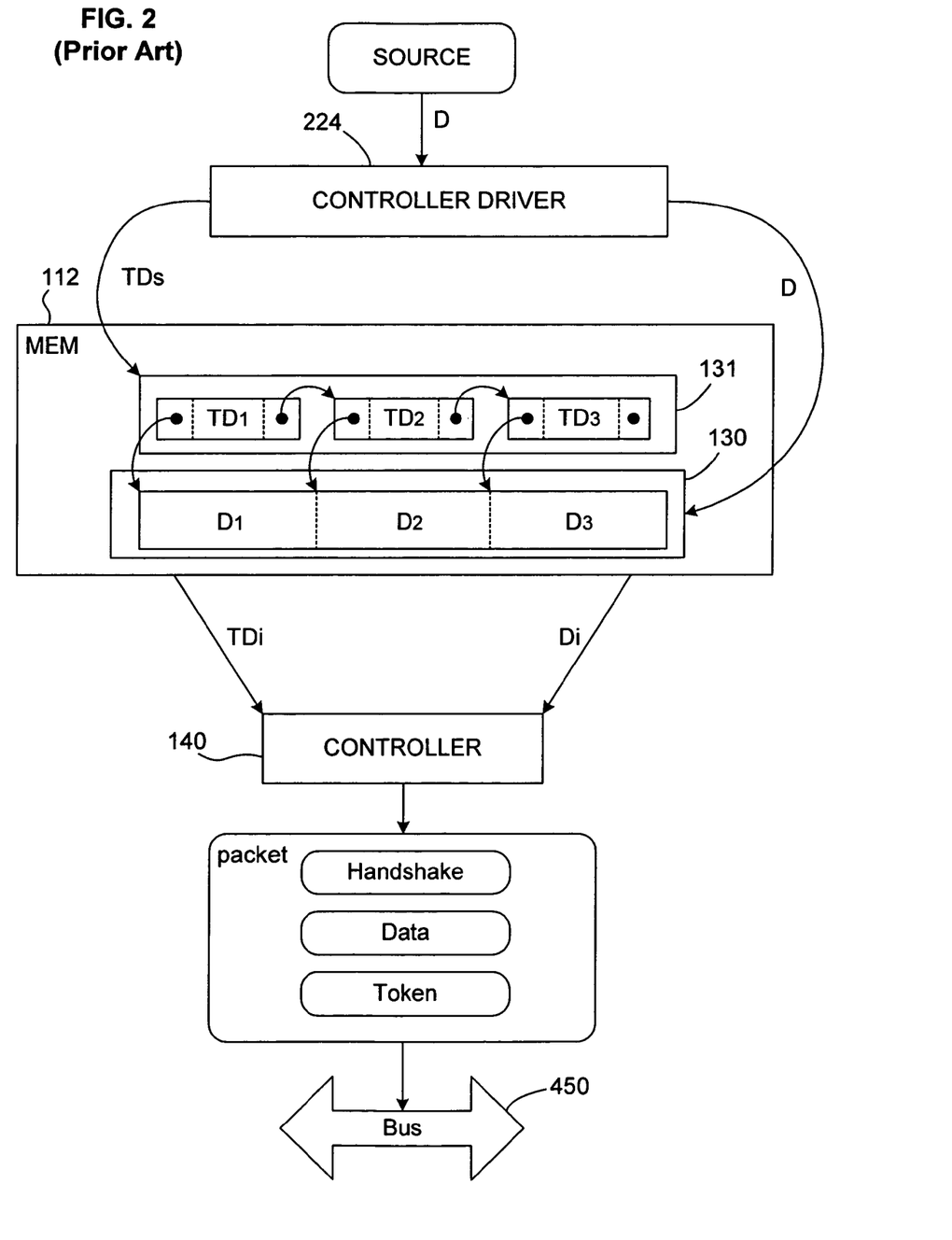
FIG. 2 illustrates the conversion of a block of data into smaller, individually transferable sub-blocks.

See also FIG. 2. The controller driver 224 then splits the source's data request into sub-blocks whose size is chosen to be consistent with bus bandwidth requirements and bus (for example, USB) protocol mechanisms. For the sake of illustration, in FIG. 2, the source data set, that is, the data block D, is shown as being subdivided into three sub-sets or "sub-blocks" D1, D2, and D3. In most practical cases, the number of sub-blocks will be much greater, depending on the size of the original data set D. Each sub-block D1, D2, and D3 of the source data block D is used as the basis for a single "transaction," which results in the data sub-block being transferred from the source's buffer 130 to the USB device, or vice versa. The transfer procedure is typically the same regardless of the number of transactions. For the most common case of bulk transfers, each data sub-block D1, D2, D3, etc., is typically limited to either 32 or 64 bytes.

The "raw" data sub-sets D1, D2, D3, etc., alone are generally not enough to adequately define the parameters of a desired transfer. Rather, each sub-set is usually included in or referenced by another data structure that also specifies such information as the destination, the direction of transfer (IN or OUT), the size of the data sub-set to be transferred, etc. In the USB context, the data structures used for this purpose are known as "transfer descriptors" (TDs). TDs are arranged usually as a linked list, and each TD also includes a pointer to the memory location of the respective actual data sub-set to be transferred, as well as a pointer to the next TD. Similar descriptors are usually also created for data transfer using other protocols. Continuing with the example of transfer according to the USB protocol, the driver 224 then builds a list of pending transactions that are targeted for one or more USB devices attached to the bus 450. Each TD defines one transaction. In FIG. 2, transfer descriptors TD1, TD2, and TD3 are shown as having been created for the respective data sub-blocks D1, D2, and D3. The TDs are also stored in memory, for example, in a memory space, that is, a TD buffer 131, established for the purpose.

In USB-based systems, at a predefined interval, the controller 140 begins to take TDs as inputs, usually (but not necessarily) one at a time, and from each TD and its respective data sub-block creates a data structure known as a "packet." The controller 140 then transfers the packets sequentially to the bus 450 via a hub 141. The concept of a "packet" has somewhat varying definitions in the literature, but is used here to refer to the data structure(s) used to transfer a single data sub-block D1, D2, and D3 to or from at least one destination via the bus 450. According to some other non-USB protocols, the controller begins the process of TD-to-packet conversion only after receiving a specific instruction to do so from the driver 224.

Each USB transfer typically consists of at least three phases, namely, a "token packet" phase," a "data packet" phase and a "handshake packet" phase. The token packet phase begins each transaction. It defines the type of transaction (IN or OUT), and, where the transaction targets a specific device, it normally includes the device address. Following the token packet comes the data packet, which is the data sub-block (D1, D2, D3, etc.) that currently is to be sent.

In order to guarantee data delivery, during the handshake packet phase, the target device returns to the sender (here: controller 140) information indicating whether the transaction was successful, whether it failed, or whether the intended target device was busy. If no signal is transmitted back to the controller within a predetermined time, then the controller 140 assumes that the packet transfer failed. In the case of a failed packet transfer, assuming any information is returned at all, the returned information normally includes at least the number of bytes that transferred successfully before the failure, and also usually a flag indicating what the error was. In the case of a busy device, the controller 140 typically attempts to resubmit the packet, and may continue to do so until the transfer is success or fails.

In the following discussion, the term "packet" is used to refer to the entire multi-phase transfer procedure described above for each data sub-block to be sent. In other words, as used here, a "packet" is all the information that passes on the bus 450 between the controller 140 and a target device in order to transfer a data sub-block, as defined by one transfer descriptor (if TDs are used at all), either to or from the device. Moreover, even though it may comprise several phases, a packet may be considered a unit, since all of its parts are required for a transfer to succeed. In the figures, packets are illustrated as small rounded boxes labeled with a "p." In FIG. 2, a packet $p_i$ is shown as having been created based on transfer descriptor $TD_i$, which in turn was generated for the data sub-block $D_i$.

As is mentioned above, at least in USB contexts, the controller 140 retrieves TDs and creates corresponding packets for transfer at specified intervals. In USB-based systems, each such interval is commonly referred to as a "frame." All the TDs (or all that can be handled in the frame) available at the beginning of each frame are used to create the packets that the controller tries to transfer during that frame. In USB systems, TDs are fetched and converted into packets at 1 ms intervals. Note that the bus 450 is typically shared, so that it cannot simultaneously carry more than one set of data at a time.

The controller 140 (usually via the driver 224) typically also indicates to the sub-system (such as one of the applications 300) that originally requested the transfer of data set D whether the requested transfer succeeded or failed. Such acknowledgement usually also takes place at 1 ms intervals. Using the USB protocol, the time it takes from when the transfer-requesting sub-system first submits the data D for transfer until it gets notification of the success or failure of the transfer is therefore roughly 2 ms. In short, each transmit/receive frame takes about 2 ms to complete, at which time the controller 140 can process the next frame of transactions (TDs). Communications procedures and mechanisms similar to those just described in the USB context are found in systems that operate according to other protocols.

Input of data from a device, that is, an IN operation, is also carried out in the form of packets, with the same protocol. As with OUT operations, TDs are generated that define the destination, buffer address, etc. of a data sub-set, but the result of transmission of a packet derived from such a TD is that the data sub-set is input from the destination and placed in the buffer 130. In short, input of a packet of data is handled in essentially the same manner as packet output, at least with respect to the data phase of the packet (the token and handshake phases need not be reversed), but the direction in which the corresponding data sub-set is transferred is the opposite.

The description above relates to conventional computer systems, but applies also, with some extensions, to virtualized computer systems. As in conventional non-virtualized systems, computers with virtualization build upon hardware and system software layers. FIG. 1 also shows the main components of a typical virtualized computer system, which includes the underlying system hardware platform 100, the system software 200, and at least one software construct known as a "virtual computer" or "virtual machine" (VM) 500.

As is well known in the art, a virtual machine (VM) is a software abstraction—a "virtualization"—of an actual physical computer system. As such, each VM will typically include virtualized ("guest") system hardware 501 and guest system software 502, which are software analogs of the physical hardware and software layers 100, 200. Note that although the hardware "layer" 501 will be a software abstraction of physical components, the VM's system software 502 may be the same as would be loaded into a "real" computer. The modifier "guest" is used here to indicate that the various VM software components, from the perspective of a user, are independent, but that actual execution is carried out on the underlying "host" hardware and software platform. The virtual system hardware 501 includes one or more virtual CPUs 510 (VCPU), virtual system memory 512 (VMEM), a virtual disk 514 (VDISK), and virtual devices 539 (VDEV), all of which are implemented in software to emulate the corresponding components of an actual computer. Of particular relevance here is that the VM will include a virtualized controller 540 (VCTRL) having the same functions as the hardware controller 140, that is, the generation and handling of packets (or analogous transfer units) and coordination of packet transfer with the communication channel.

The guest system software 502 includes a virtual or "guest" operating system 520 (guest OS, which may, but need not, simply be a copy of a conventional, commodity OS), as well as drivers 522 (DRVS) as needed, for example, to control the virtual devices 539. Of particular relevance here is that a driver 524 is included for the virtual controller 540 (itself a virtual device); the driver 524 operates in the same manner as the driver 224.

Of course, most computers are intended to run various applications, and a VM is usually no exception. Consequently, by way of example, FIG. 1 illustrates one or more applications 503 installed to run on the guest OS 520; any number of applications, including none at all, may be loaded for running on the guest OS, limited only by the requirements of the VM. If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 1 illustrates a single VM 500 merely for the sake of simplicity; in many installations, there will be more than one VM installed to run on a common hardware platform; all will have essentially the same general structure, although the individual components need not be identical.

Some interface is usually required between the VM 500 and the underlying "real" or "host" OS 220 and hardware 100, which are responsible for actually executing VM-issued instructions and transferring data to and from the actual, physical memory and disk 112, 114. In this context, the "host" OS means either the native OS 220 of the underlying physical computer, or whatever system-level software handles actual I/O operations, takes faults and interrupts, etc.

One advantageous interface between the VM and the underlying system software layer and/or hardware is often referred to as a virtual machine monitor (VMM). Virtual machine monitors have a long history, dating back to mainframe computer systems in the 1960s. See, for example, Robert P. Goldberg, "Survey of Virtual Machine Research," IEEE Computer, June 1974, p. 54–45. A VMM is usually a thin piece of software that runs directly on top of a host, such as the system software 200, or directly on the hardware, and virtualizes all the resources of the (or some) hardware platform. The VMM will typically include a software module 640 for emulating devices, as well as modules for such functions as memory management 616, etc. The interface exported to the respective VM is usually such that the virtual OS 520 cannot determine the presence of the VMM. The VMM also usually tracks and either forwards (to the host OS 220) or itself schedules and handles all requests by its VM for machine resources as well as various faults and interrupts. The general features of VMMs are known in the art and are therefore not discussed in detail here.

In the figures, a VMM 600 is shown acting as the interface for the single VM 500. It would also be possible to include each VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different virtual operating systems) than it is simply to include a separate VMM for each VM. This invention described below works with all such VM/VMM configurations.

The important point is simply that some well-defined, known interface should be provided between each installed VM 500 and the underlying system hardware 100 and software 200, and that this interface should contain the components of the invention described below. Consequently, instead of a VMM, with respect to the data transfer procedures described below, the interface between the VM (or other software-implemented computer) and the host software and hardware could be one or a group of device emulation sub-systems.

In some configurations, such as the one illustrated in FIG. 1, the VMM 600 runs as a software layer between the native system software 200 and the VM 500. In other configurations, the VMM runs directly on the hardware platform 100 at the same system level as the host operating system (host OS). In such case, the VMM typically uses the host OS to perform certain functions, often I/O, by calling (usually through a host API—application program interface) the host drivers 222. In this situation, it is still possible to view the VMM as an additional software layer inserted between the hardware 100 and the guest OS 520. Furthermore, it may in some cases be beneficial to deploy VMMs on top of a thin software layer, a "kernel," constructed specifically for this purpose. Compared with a system in which VMMs run directly on the hardware platform, use of a kernel offers greater modularity and facilitates provision of services that extend across multiple virtual machines (for example, resource management). Compared with the hosted deployment, a kernel may offer greater performance to because it can be co-developed with the VMM and be optimized for the characteristics of a workload consisting of VMMs. The invention described below may be used in all these different configurations.

In addition to controlling the instruction stream executed by software in virtual machines, the VMM also controls other resources in order to ensure that the virtual machines remain encapsulated and do not interfere with other software on the system. First and foremost, this applies to I/O devices, but also to interrupt vectors, which generally must be directed into the VMM (the VMM will conditionally forward interrupts to the VM). Furthermore, the memory management (MMU) functionality normally remains under control of the VMM in order to prevent the VM from accessing memory allocated to other software on the computer, including other VMs. In short, the entire state of the VM is not only observable by the VMM, but the entire operation of the VM is under the control of the VMM.

According to the prior art, packet-based data transfer between a source (such as one of the applications 503) within the VM and a physical device (destination) is essentially the same as described above in the non-virtualized context, with the exception that the transfer is "duplicated": The source data block D is first transferred (usually, copied) from the transfer-requesting source process into a buffer 530, which is normally established by the source process itself (the normal case) but could alternatively be established by the driver 524. The driver 524, which is analogous to (and in many cases an identical copy of) the driver 224, then builds a list of TDs from the buffered data and stores the TDs in, for example, a memory space 531.

The virtual device controller 540 (a software analog of the controller 140) then constructs packets from the TDs and corresponding data sub-blocks, and passes them sequentially to what it "believes" is a channel (such as 450). In fact, however, the VM-issued packets are received (in particular, intercepted) by an emulated bus 650 (see FIG. 3) within the VMM. The VMM in turn passes each VM-issued packet to the system software and hardware, which places the (or a corresponding) packet on the "real" bus 450. Note that the device to which (or from which) the packets are to be sent (or received) is typically one of the physical devices 400-1, 400-2, . . . , 400-m, although these may also be emulations.

As can be understood from the discussion above, with respect to packet-based transfer, the VM is designed and intended to act just like a conventional non-virtualized system, the major structural difference being that the various hardware components involved, including the controller 540 and the channel, are implemented in software. Again, with respect to packet transfer, the VM/VMM interface is essentially a software "copy" of a hardware 100/channel 450 interface.

In many cases, virtualization increases the ability of the system as a whole to adapt to new devices. For example, a given host OS 220 may not be able to communicate with the latest digital camera, either because the proper driver has not been installed, or because no driver is even available for the host OS 220: The host OS might be a version of Linux, for example, whereas the camera manufacturer might supply drivers only for Microsoft Windows operating systems. In this case, one could install the Windows OS in the VM as the guest OS 520 and run the VM on the Linux-based host OS 220. The camera driver can then be installed as one of the drivers 522 in the VM. Regardless of the guest OS/host OS relationship, what is then needed is some way for the camera driver to communicate with the actual device (the physical camera) without having to rely on any camera driver in the host OS 220. Techniques to accomplish such "packet pass-through" are known.

Whether in a "real" or virtualized system, and especially where packet pass-through is implemented, packet transfer in the prior art suffers from a similar problem, namely, delay. A major factor that contributes to delay, however, is the 2 ms (in USB contexts) interval at which new TDs are fully processed by the controller 140 (including reporting the results of the attempted transfers). This delay is especially problematic in virtualized (or other software-implemented) computer systems: In order to correctly emulate the actions of a bus, the VMM must return information to the virtual controller indicating the success or failure (or destination busy state) of each packet that the virtual controller sends. The VMM cannot indicate a transfer result for a packet, however, until it in turn receives indication of success or failure of the transfer of the packet by the hardware controller via the "real" bus 450. The VMM must therefore wait for the results of the "real" transfer before it can pass the results on to the virtual controller. Because the current VM-generated packet will be the only one the VMM presents for further processing and actual transfer by the hardware controller, only that one packet will be processed during the 2 ms two-way transfer period. The most common case is therefore also the worst case: It may take around 2 ms to completely transfer each single packet from the VM. In many cases, especially where many packets must be transferred, the resultant delay will be unacceptable; indeed, the accumulated delay may render some time-critical transfers altogether impossible.

What is needed is a mechanism that increases the speed with which packet-based I/O operations can be carried out, without violating the requirements of the given I/O protocol, especially where the request to transfer data must cross more than one transfer interface, in particular, where the source of the transfer request is in a software-implemented computer such as a virtual machine. This invention provides such a mechanism.

SUMMARY OF THE INVENTION

The invention provides a method, and system implementation, for transferring a data set between a transfer-initiating subsystem and a target via an intermediate subsystem and a transfer-executing subsystem, and a transfer channel. In the various embodiments of the invention, the transfer-initiating subsystem follows a first transfer protocol in which the data set is assumed to be transferred as a series of units such as packets, each of which may be smaller than the data set itself. Data transfer between the transfer-executing subsystem and the target conforms to a second protocol, which may, but need not, be the same as the first protocol. According to the invention, the intermediate subsystem provides for transfer of, preferably, the entire data set before completion of the transfer of packets from the transfer-initiating subsystem. The transfer of at least one subsequent packet from the transfer-initiating subsystem is contingent on completed transfer of at least one previous packet; in other words, transfer of the sequence of packets can be suspended. The transfer-executing subsystem, for its part, initiates data transfer via the channel upon receipt of a transfer request and of identification of the data set to be transferred.

According to the invention, when the intermediate subsystem receives a first one of the packets from the transfer-initiating subsystem, it signals to the transfer-initiating subsystem that the transfer of the first packet is still pending, so that the transfer-initiating subsystem at least temporarily delays submission of subsequent packets to the intermediate subsystem. The intermediate subsystem then issues to the transfer-executing subsystem a transfer request and identifies for it the data set to be transferred; the transfer-executing subsystem then attempts transfer of the data set. When the transfer-executing subsystem signals the intermediate subsystem that the requested transfer has completed, the intermediate subsystem then signals to the transfer-initiating subsystem that the transfer of the first packet has finished. The intermediate subsystem then proceeds to accept and receive subsequent packets from the transfer-initiating subsystem and, for each, it signals to the transfer-initiating subsystem completed transfer of each subsequent packet.

The invention may be used for data transfer in either direction, that is, from the transfer-initiating subsystem to the target (an OUT operation) and/or from the target to For OUT operations, the transfer-initiating subsystem stores the data set in a memory space accessible to the intermediate subsystem. The intermediate subsystem then creates a copy of the data set by accessing the memory space in which the transfer-initiating subsystem has stored the data set, and it does so independently of action by the transfer-initiating subsystem. The intermediate subsystem then identifies for the transfer-executing subsystem the copy of the data set as the data set to be transferred.

In the most commonly anticipated application of the invention, the transfer-initiating subsystem derives, for the data set stored in the memory space, a plurality of descriptors, each descriptor specifying at least a memory location (address) of a corresponding sub-set of the data set. Packets are generated at least partially based on the descriptors. In these implementations, the preferred embodiment of the invention creates the copy of the data set by evaluating the descriptors.

Because the transfer of packets from the transfer-initiating subsystem is suspended while the data set is actually being transferred to the target, it is possible that the transfer-initiating subsystem may change the data set to be transferred before the pending transfer is finished. To prevent the data inconsistency that might thereby arise in OUT operations, the preferred embodiment of the invention includes a mechanism within the intermediate subsystem for checking that the data set that is currently being transferred (or has finished being transferred) is actually what the transfer-initiating subsystem still wants to be transferred. If the intermediate subsystem detects an inconsistency, it preferably creates and submits a copy of the changed data set to the transfer-executing subsystem for transfer to the target.

In applications of the invention in which the transfer-initiating subsystem forms packets based on descriptors, the intermediate subsystem determines whether the transfer-initiating subsystem has changed the data set by comparing the descriptors corresponding to the data set currently being transferred by the transfer-executing subsystem copy with the descriptors of the possibly changed data set currently designated for transfer by the transfer-initiating subsystem. In the preferred embodiment of the invention, the memory addresses of the descriptors themselves are compared rather than the contents of the descriptors.

For IN operations, the intermediate subsystem creates a buffer it which the data set transferred from the target is stored. Upon completed transfer and storage of the data set, and upon receipt by the intermediate subsystem of each packet from the transfer-initiating subsystem, the intermediate subsystem then copies a corresponding portion of the data set to the packet. Where the transfer-initiating subsystem creates packets from descriptors, the size of each portion of the data set copied to its respective packet corresponds to the size of the subset specified by the corresponding descriptor.

The channel between the transfer-executing subsystem and the target may be considered a first channel, in which case a second channel is preferably emulated in the intermediate subsystem. All packet transfer between the transfer-initiating subsystem and the intermediate subsystem takes place over the emulated, second channel.

In the preferred embodiment of the invention, the transfer-initiating subsystem is a software-implemented computer such as a virtual machine and the intermediate subsystem is a virtual machine monitor.

One example of a transfer protocol for which the invention is particularly efficient is the where the channel(s) follow the common USB protocol. It is not strictly necessary according to the invention, however, for the transfer-initiating subsystem to operate using the same transfer protocol as the transfer-executing subsystem. Where the invention is to be used for such mixed-protocol transfers, the intermediate subsystem preferably includes a protocol translation module.

DETAILED DESCRIPTION

In broadest terms, the invention involves a mechanism according to which a data set that is to be transferred piecewise, that is, in sub-sets, across multiple interfaces is buffered in such a way that more than sub-set of the data block can "cross" a higher-level interface at a time. Additional mechanisms are included to reduce latency effects, to increase transfer reliability, and to avoid potential errors that might arise due to deviations from the standard transfer protocol. In the preferred embodiment of the invention, packet transfer is between a virtual machine (VM) and a USB device, because of the advantages of virtual machines in general and because USB devices are so widespread. The invention is therefore described below primarily in this context. Modifications to the techniques and mechanisms according to the invention in order to adapt the invention for use in non-virtualized computer configurations and/or in conjunction with transfer protocols other than USB, to the extent such modifications will be necessary at all, will be within the skill of I/O software designers.

The preferred embodiment of the invention builds on the general structure of a virtualized computer system as illustrated in FIG. 1. Accordingly, the known features of typical system hardware 100, system software 200, of a virtual machine 500 and its related virtual machine monitor (VMM) 600 are assumed to be present in the invention as well, but are not described further except as needed for an understanding of the unique features of the invention. The invention is described below mainly with reference to packet transfer between the VM 500 and one or more destinations (labeled collectively as 400). Note, however, that the sub-system that initiates a data transfer invention need not be a virtual machine, but rather could be any software-implemented computer; indeed, the invention may also be used in systems where the transfer is initiated by a hardware device, or by a sub-system that combines hardware and software.

Figure 3:
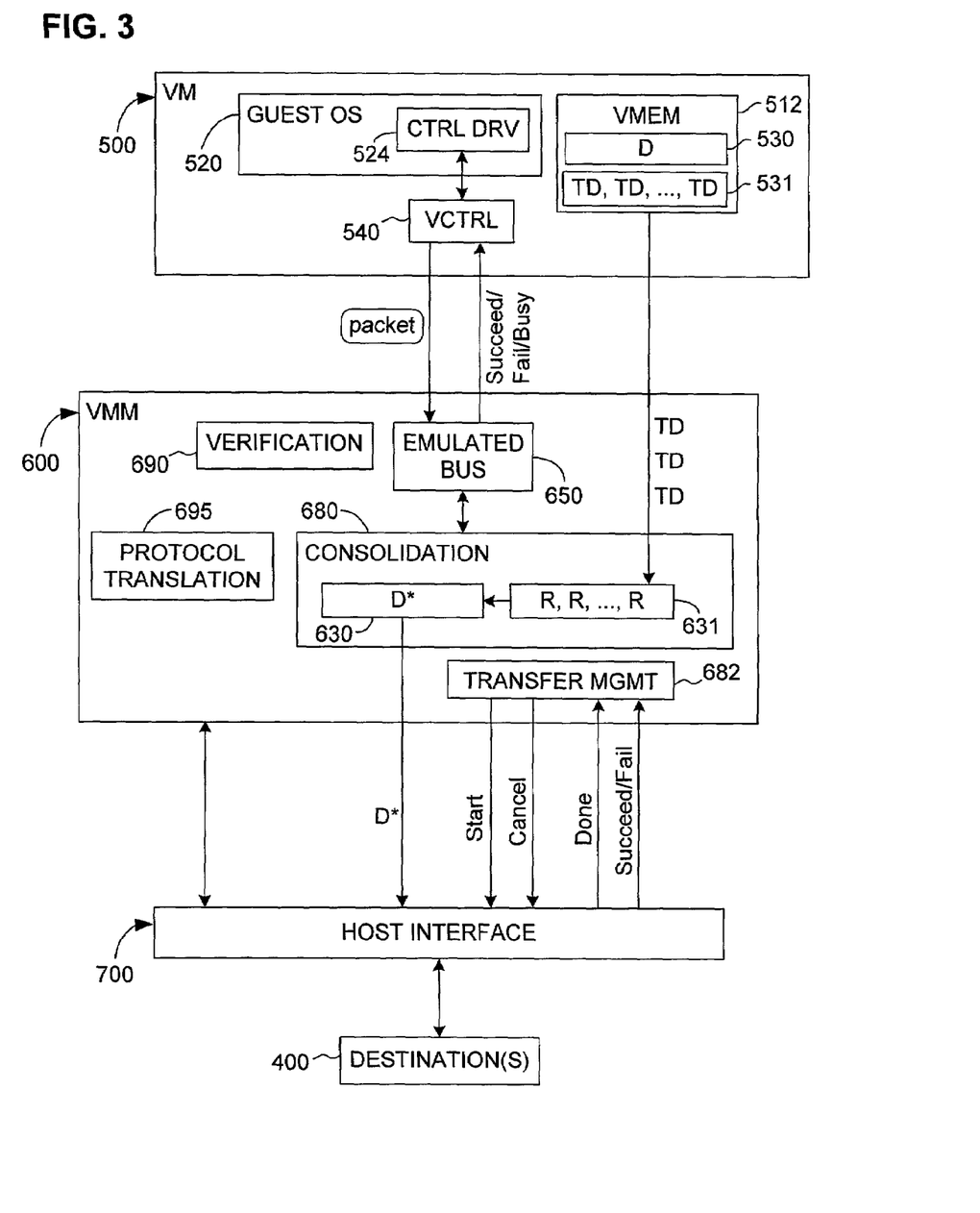
FIG. 3 is a block diagram that shows the main components of an I/O mechanism according to the invention.

FIG. 3 illustrates the main features of the invention. In FIG. 3, the system hardware and system software are grouped for the sake of clarity into a single block referred to as a host interface (HIF) 700, which includes the host OS 220 and the controller 140. Note that the invention assumes only that there is some interface between a sub-system (a VM, for example) that wishes to transfer data (either IN, from the destination, or OUT, to the destination) and a destination 400. As such, the host interface 700 may be viewed essentially as a "black box" that takes data and a transfer request (including an identifier of the target destination) as inputs and that returns an indication of the success or failure of the transfer. The operation of the host interface for a transfer IN will be essentially the reverse of the OUT operation, and is well understood in the art of system I/O design.

Assume now that some source process within the VM 500 (such as an application 503 or the guest OS 520 itself), wishes to output a data set D to the destination 400. In the following description, this sub-system is referred to at times as the "source," since it is the source not only of the request to initiate a transfer, but also of the information necessary to carry out the transfer. As in the prior art, the transfer-initiating process will establish a buffer 530 in which it stores the source data block D. The controller driver 524 then partitions the source data set D into sub-sets, whose size is determined by the transmission protocol (such as USB), and also creates a TD for each sub-set; the TDs are stored in a buffer 531, or some other well-defined equivalent memory space. Using as inputs the information in each TD and the data sub-set to which it points, the virtual controller 540 then constructs packets, which it sequentially transfers to what it assumes is a physical bus, but which in fact is an emulated bus 650 located within the VMM.

Note that the frame rate of 1 ms (for USB transfers) will also be programmed into the virtual controller 524. Recall that the controller will wait for acknowledgement of transfer of one packet before it places the next packet on the bus. From the point of view of the VM (and its user), packets are transferred, following the USB protocol, one at a time, out of (or into) the virtual controller 540, which, just as the hardware controller 140, will then wait for packet acknowledgement from the target device before sending the next packet.

Note, however, that the virtual memory space 512 and all of the operations of the VM are not only observable by but are also under the control of the VMM. This implies that the entire source data set D in buffer 530, as well as the entire current set of TDs created by the driver 524 (or any equivalent net-access software component) are available to the VMM.

According to the invention, a packet-consolidation module 680, which may be coded using known programming techniques, is included within the VMM. In FIG. 3, the consolidation module 680 is shown as being a software component separate from the emulated bus 650. This is for the sake of clarity, and because the VMM may have an emulated bus even absent the invention. These modules may, however, be implemented as separate portions of a single software sub-system installed within the VMM.

Recall now that each TD normally contains a pointer to the beginning address of a data sub-block in memory, as well as information (such as number of bytes) concerning the size of the data sub-block. In other words, given a TD, one can locate the corresponding data sub-block that is a part of the entire data block D that the source wishes to transfer. In embodiments of the invention in which the USB protocol is to be used, each TD thus identifies the data to be transferred in one packet, that is, it defines one transaction. Recall also that all TDs for buffered data are created by the controller driver and are available in memory even before the controller sends any of the corresponding packets. The same applies to the virtual computer 500: TDs are available in memory 512 (in the illustrated embodiment, in the memory space 531) before the controller 524 attempts to transfer them to the "bus" 650.

There are different ways for the VMM to detect that the VM wishes to initiate data transfer. One way is simply for the VMM to note the presence of unprocessed TDs in the buffer 531. Another is for the emulated bus 650 to indicate that the virtual controller 540 has issued a packet. Since the entire operation of the VM is in general observable by the VMM, still other ways are possible. Regardless of the method of detection, when the VMM detects that the VM has at least one TD ready for processing, the consolidation module 680 retrieves all the TDs corresponding to the buffered data D. Based on these TDs, the consolidation module 680 locates all sub-blocks of the data D. According to the invention, these sub-blocks are then copied, preferably in order, into a collection or "consolidation" buffer 630.

Figure 4:
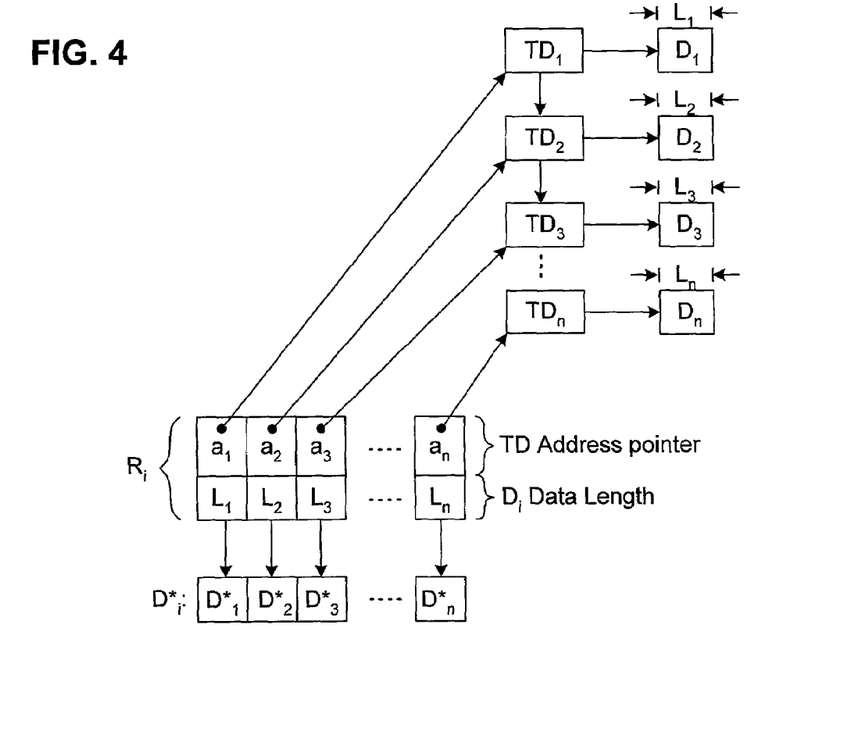
FIG. 4 illustrates a structure for comparison of data blocks that is implemented in a preferred embodiment of the invention.

In the preferred embodiment of the invention, for each OUT transfer, the consolidation module 680 also creates and stores (for example, in a memory space 631) an output record ("OutRecord") R for each TD. FIG. 4 illustrates a simplified structure for OutRecords $R_1, R_2, R_3, \ldots, R_n$. Each OutRecord $R_i$ (i=1, ... n) is a data structure that includes at least two elements: a pointer $a_i$ to the memory address of the corresponding $TD_i$ and the length $L_i$ of the data sub-set $D_i$ to which $TD_i$ points. In order to locate $D_i$ and from it create the copy $D^*_i$, the consolidation module may thus evaluate the TD located at address $a_i$ and copy the $L_i$ bytes (or other predetermined units) of data that are stored in the buffer 530 beginning at the address of the data subset $D_i$ to which $TD_i$ points. Note that the OutRecords R can be created based on the TDs alone. Of course, it would also be possible for the consolidation module to create D* by directly accessing the TDs themselves, or by storing a copy of the TDs in the memory space 631 and using the copied TDs to locate the data subsets $D_i$. In the preferred embodiment of the invention the OutRecords R are also used, however, to efficiently check for data consistency and are therefore the preferred data structures; this data verification procedure is described below.

The procedural steps that the consolidation module 680 carries out to set up the buffer 630 differ somewhat depending on whether the transfer is OUT or IN. In the preferred embodiment of the invention, the main steps for each of these directions are as follows, and are referred to as SCAN and ISSUE operations. Beginning with the first VM-created TD (that is, the first in a series or a most current one), the module 680 steps through the list of TDs and performs the following action for each TD until a termination condition is reached:

SCAN:
For each IN $TD_i$:
  Increment a counter n (for packet-based transfer; in other cases, such as byte-based transfer, increment the counter accordingly);
For each OUT $TD_i$:
  Copy the data subset $D_i$ pointed to by $TD_i$ to the buffer 630;
  Create a new OutRecord $R_i$ from $TD_i$.

The SCAN operation should terminate not only when it reaches the end of the TD list, but preferably also in certain other circumstances, such as the following:

After any TD whose data size is less than the maximum packet size of the target devices pipe, in order to ensure proper detection of "short reads" and to enable correct emulation of OUT failures;

At any TD with a different destination pipe. (Although this will in most applications not be technically required for IN operations, the marginal benefit of a parallel scan will in practice be less than the overhead and complexity required to implement it);

At a TD with different direction (IN vs. OUT), in order to avoid disadvantageous side effects, such as potential data incoherence in the case of mixed IN and OUT operations;

At the end of host controller-specific sub-list. Certain host controller emulations may define logical subsets of TDs within a single list, which for added safety and/or emulation correctness, should be honored. A UHCl queue is one example.

Other implementation-specific conditions. It may, for example, be desirable to terminate batch transfer early for reasons of practicality or relating to the VMM emulation. Examples of such conditions include buffer limits, limits imposed by the host interface, requirements to emulate in a single pass, etc.

ISSUE: Once the SCAN procedure is complete:
For IN transactions: The VMM issues a "Start" (or equivalent) instruction to the HIF specifying the transfer direction as IN; the destination as specified by the scanned TDs; and, if required by the protocol, other parameters such as the value of the total size of the data to be transferred, for example as a function of n times the maximum packet size of the destination.

For OUT transactions: The VMM issues the Start instruction to the HIF specifying the transfer direction as OUT, the destination as specified by the scanned TDs; and, if required by the protocol, other parameters such as the value of the buffer 630.

The effect of this is that a reconstructed copy D* of the data block D is created in the buffer 630. Of course, as long as the copy (or suitable address pointers) is created, then the specifics of establishing the buffer 630 may be varied according to the needs of a given implementation and the preferences of the designer. It would also be possible for the consolidation module 680 to analyze the address pointers and data size values of the TDs in order to locate and copy the entire data block D into the buffer 630 in a single operation, although such a procedure assumes that D is in contiguous memory. All that is required is that the data block D be reconstructed as a copy D* in the buffer 630 using some well-defined mechanism. For IN operations, the data transferred from the target destination, via the host interface 700, to the VMM, is copied into the buffer 630 for later transfer to the source in the VM, via the virtual controller 540.

At this point, for OUT operations, in the preferred embodiment of the invention, a complete copy of the data block D that the VM wants to transfer to a specified destination 400 is available as D* within the VMM. From the perspective of the host interface 700, the VMM may be viewed as any other process that would want to transfer a block of data to some destination 400. According to the invention, the VMM therefore issues a standard transfer request, for example, the Start command, to the host interface 700 and passes to it (or simply gives the memory address information for) the consolidated, that is, "batched" data block D*. The host interface 700 may then transfer the data D* via the bus 450 to the target destination, as described above, just as it would in the case where an application 300 had requested the data transfer.

For IN operations, TDs will be created as for OUT operations, but there will of course be no block of data D from which to reconstruct the data block D*; instead, the TDs will specify the size of the data block that is to be transferred from the target to the source (VM). Based on the TDs, the consolidation module 680 therefore creates in the buffer 630 an empty, temporary data set D* corresponding to the data set that is to be input from the target. In other words, the buffer is set up to be able to contain at least as much data as is to be transferred IN from the target. When transfer IN from the target to the host interface completes, the VMM (or other analogous intermediate sub-system) stores the input data set in the temporary buffer 630 as the block D* and then, via the emulated bus 650, copies packet-size portions of D* from the temporary buffer to the initiating sub-system's packets as these packets are issued from the virtual controller 540 and processed via the emulated bus 650.

One result of this arrangement according to the invention is that the data block D essentially "bypasses" the normal packet-based interface between the VM and the emulated bus 650. This means in turn that the transfer of data block D out of the VM effectively takes place as a batch—much faster than it would otherwise, since it is not dependent on the standard 2 ms delay per host interface operation (for USB devices).

As in conventional systems, the host interface 700 generates at least one result signal ("Succeed/Fail") to indicate to a transfer-requesting sub-system whether the requested transfer was successful or not. From the perspective of the host interface 700, however, the VMM is the transfer-requesting sub-system. In FIG. 3, for example, the host interface returns an indication to the VMM that the transfer of D* is completed, and whether the transfer was successful or whether it failed. A transfer management module 682, which may be coded using known programming techniques, is preferably included within the VMM in order to generate the transfer request command ("Start"), to receive the indication ("Complete") that the transfer operation is completed, the result signal ("Succeed/Fail") concerning the result of the transfer, and also, as necessary, to issue a command ("Cancel") to cancel the pending transfer request.

In many cases, several different overlapping or simultaneous transfer requests may originate within the VM with different target destinations—one of the purposes of a standard such as the USB is that different devices can be connected to a common bus. Recall that each TD will typically include the USB device address of the respective target device. The consolidation module 680 therefore preferably groups and processes retrieved TDs by target destination, that is, it retrieves the TDs, creates corresponding OutRecords R and a separate copy of the respective data block, and requests transfer to/from each target device in the manner described above for the single target device.

As is mentioned above, assuming the USB protocol by way of example, after sending a packet, the device controller 140 waits to send the next packet in sequence until it determines whether the current packet was transferred successfully. In the most common case, the target device itself returns information concerning the transfer, in particular, whether it was successful, whether the device was busy, and how many bytes (or other units) of data were transferred. The virtual controller 540 will act in the same manner, that is, it will wait until packet $p_i$ has been transferred successfully before putting packet $p_{i+1}$ on the bus 650.

Because of the batch creation and transfer of D*, however, the transfer of data from the physical controller 140 to the physical channel 450 will not be synchronous with the transfer from the virtual controller 540 to the emulated bus 650. Indeed, the transfer from the host interface 700 to the channel 450 need not even take place using packets. Still assuming the USB protocol by way of example, however, packets derived from D* will be transferred to the physical bus 450 before corresponding packets (other than the first, or the first in some group) derived from D are even submitted to the emulated bus 650. In fact, the entire data block D* may be transferred successfully to the target device in the time it would normally take for a single packet to be transferred to the target destination using technology according to the prior art.

One way to deal with this break in synchronization would be for the emulated bus to return to the virtual controller 540 "fake" signals indicating successful packet transfer so that the virtual controller continues putting subsequent packets on the emulated bus 650. The virtual controller 540 would therefore "believe" that it was operating as normal, even though actual transfer of D would already have passed in a batch mode to the host interface 700 as the consolidated data block D*. The disadvantage of this method, though, is that it may lead to problems of incoherence that cannot be recovered from at all, or only with considerable effort. For example, if the actual transfer of D* to the target device is for some reason delayed, but the emulated bus 650 falsely tells the virtual controller 540 that all packets were transferred successfully, then the source within the VM might proceed with other processing tasks that are conditioned on the successful transfer of D.

In order to reduce the risk of such inconsistency, in the preferred embodiment to of the invention, upon receipt of the first packet from the virtual controller 540, the VMM (for example, the emulated bus module 650) returns to the virtual controller 540 a signal indicating that the transfer of the first packet was not successful because the target device was temporarily unable to receive it, or that the transfer for some other reason is still pending. Most USB controllers interpret such a "Busy" signal as an indication to try the transfer again, typically, but not necessarily, after some waiting period. The VMM continues to return this "Busy" signal to the virtual controller even on subsequent attempts by the virtual controller to send the first packet. This continues until the VMM (for example the transfer management module 682) receives indication that the physical controller 140 has successfully transferred the entire data block D* to the target destination, or that the transfer failed. In other words, the VMM tells ("lies to") the virtual controller to retry the packet transfer later, while at the same time performing the operations described above to create the copied data block D* and have it transferred to the target destination by the hardware controller 140.

Once the data block D* has been successfully transferred to the target destination (or input from the destination), then the emulated bus may stop telling the virtual controller to try again and may begin accepting packets at whatever rate the virtual controller sends them. During the handshake phase of each packet transfer, the emulated bus 650 may then return to the virtual controller 540 the signal that each packet was transferred successfully.

In conventional systems, a transfer may fail for any of several reasons, for example, the intended destination device might be disconnected, might not be turned on, or might be malfunctioning, or even as part of a standard protocol. Any delay in issuing a response to the packet-issuing system (here, the VM), can cause not only delay, but also poor or incorrect performance; for example, the issuing system may attempt to reset the destination device if it interprets delay as indicating that the device is malfunctioning.

The question therefore arises as to what the VMM should do if the source within the VM "changes its mind" while the virtual controller it is being told to try a packet transfer later. The change of mind may be of either of two types.

The first type of change is that the source may decide to cancel the transfer altogether rather than wait. This may be the case, for example, where packet-issuance itself is time-critical to the source. In this case, the VMM may also cancel the on-going transfer of D* by issuing (for example, from the transfer management module 682) a standard Cancel command to the host interface.

The second type of change that the source might make while the consolidated data block D* is being transferred is that the source might change the data is wishes to transfer, that is, change D, upon a subsequent attempt to transfer it. In this case, D* would no longer be identical to D, so that the transfer of D* would no longer be appropriate. This problem would be most likely to occur in the context of OUT operations. The preferred embodiment of the invention therefore includes a procedure for detecting such interim changes.

According to the most straightforward detection method, a data verification module 690 within the VMM performs a byte-by-byte (or word-by-word, etc., depending on the memory architecture) comparison of the data block D currently buffered for transfer to the emulated bus 650 with the data block D* that is in the process of being transferred to the physical bus 450. As a less time-consuming but also less reliable alternative to full byte-by-byte comparison, the VMM could instead perform a standard hash comparison, or compare check-sums of the two data blocks.

The main drawback of the full comparison method is that it is relatively slow and is in practice no better than a quick approximation. Recall that each TD (in the USB context) points to a sub-block of around 64 bytes of data. In other words, verification of each sub-block would require 64 compare operations, and there may be a large number of TDs and corresponding sub-blocks. FIG. 4 illustrates a preferred comparison routine that, although not providing 100% certainty, is much faster than full comparison yet has a level of reliability that will be satisfactory in all but rare cases.

In order to understand the preferred data block verification method, it is helpful to keep in mind certain properties of memory allocation: When a process within the VM requests transfer of a block of data D, the process establishes the buffer 530, which typically involves requesting that the (guest) operating system 520 allocate the needed memory space. Similarly, when the controller driver 524 creates the TDs, it requests allocation of memory for the corresponding buffer 531. Note that neither the buffer 520 nor the buffer 531 necessarily occupy contiguous memory locations. Allocation of memory is of course a fundamental task of an operating system. Even if the identical block of data D is submitted for transfer to the (emulated) bus at two different times, it is very unlikely that it, and especially its corresponding TDs, will be buffered at the same memory locations as were used for any previous data set and corresponding TDs.

In the preferred embodiment of the invention, in order to detect any interim change in the data set to be transferred, the data verification module 690 compares the addresses of the list of TDs previously buffered in the VM for the requested transfer with those of the "new" TDs currently stored in the buffer 631. Recall that each OutRecord $R_i$ preferably includes a pointer ($a_i$) to the address of a corresponding $TD_i$. The data verification module 690 can therefore compare $a_i$ with the current address of $TD_i$ in the buffer 531. If all the pointers $a_i$ match the respective current $TD_i$ addresses, then it can be assumed that that no change has been made in the data to be transferred and the VMM may continue to wait for the results of the actual transfer to the physical bus.

If even one mismatch occurs, however, then the module 690 assumes that the transfer-initiating process has changed the data set D, which must be therefore be reprocessed (into a new D*) and transferred again. The VMM (for example, the transfer management module 682) therefore cancels the currently on-going transfer and begins the batch transfer procedure described above for the new block of data in the buffer 530. Note that the VMM may carry out the data block verification procedure essentially as a background operation, without halting the ongoing actual transfer of packets to the physical bus. Furthermore, data block verification is not restricted to any particular frame rate, such as the 2 ms two-way rate for USB packet transfers, but rather may be done at the full execution speed of the VMM.

Instead of comparing the addresses of current and "in progress" TDs in order to detect changes in the data set to be transferred, it would also be possible to compare the addresses of the current and "in progress" data subsets. In this case, the pointer as in each OutRecord $R_i$ should be to the address of the respective data subset $D_i$ instead of to $TD_i$. Regardless of whether data verification is based comparison of addresses between current and "in progress" TDs or data subsets, note that the preferred data verification procedure will require roughly 1/64 as many compare operations as full bytewise comparison would.

The data verification procedure according to the invention may be carried out at different times. In order to detect changes as quickly as possible, the VMM preferably verifies the in-progress data set every time the virtual controller 540 attempts to resend a packet (after having received the Busy signal). This method also helps avoid completed transfer of a data set D* that the VM no longer wishes to transfer at all. Alternatively, the VMM may wait until it has received the signal from the host interface 700 that transfer of the data set D* has been completed; before signaling success to the VM, the VMM first confirms that the data to be transferred is what the VM actually still wants to be transferred.

As is known in the art, one of the functions of a VMM is to handle memory mapping between the address space used by the VM and the address space in the actual hardware memory and disk devices. In other words, the VM/VMM configuration introduces an extra degree of indirection in addressing. A memory management unit 616 (FIG. 1) is normally included in the VMM for this purpose. One other function that this memory management unit is normally able to perform is that it can place (commonly by using the support provided by the hardware MMU 116) traces on memory. As still another alternative mechanism for verifying that the data set D* currently being transferred is identical to the data set D that is currently buffered for transfer in the VM, the VMM could place WRITE traces on the memory addresses at which the data set D (or the TDs) is stored. The VMM will then be able to detect any attempt by the VM to change the data set D by trapping the fault issued by the trace mechanism. Note that such a trace-based detection mechanism will work best (and, in some cases, only) if the buffer 530 (or 531, if changes to TDs are detected) resides in a fixed memory space, so that changing any part of D involves overwriting data already in the buffer.

One other problem that may arise when using the consolidation and batch transfer method according to the invention is that the target device might "fail" a packet. In order to accurately simulate this behavior to the VM, the VMM must therefore determine which packet failed. According to the standard USB protocol, whenever the transfer of a packet fails, the host interface 700 returns to the transfer initiating sub-system (here, the VMM) not only a failure signal, but also the number of bytes that were successfully transferred.

Assuming a standard packet size (for example, the 32- or 64-byte USB packet size), the VMM (for example, the transfer management module 682) therefore determines which packet failed by dividing the number of successfully transferred bytes by the number of bytes in a standard packet (for USB devices, usually 64). For example, if 256 bytes transferred successfully, then four packets succeeded and the fifth failed. The VMM (in particular, the emulated bus) can therefore signal to the virtual controller success of four packets, and issue a failure return for the fifth. The source in the VM can then take whatever steps it would take in such a case, which would then also reflect what actually happened. Note that, in actual USB packet transfers, if failure occurs, it usually occurs on the very first packet. The packet-counting procedure described above may be easily extended for use with transfer protocols that use variable packet sizes (or even for data transmitted in other units or even streamed serially) as long as the failure counter returned by the host interface can be uniquely converted in the VMM into a packet identifier that can be passed to the VM.

Figure 5:
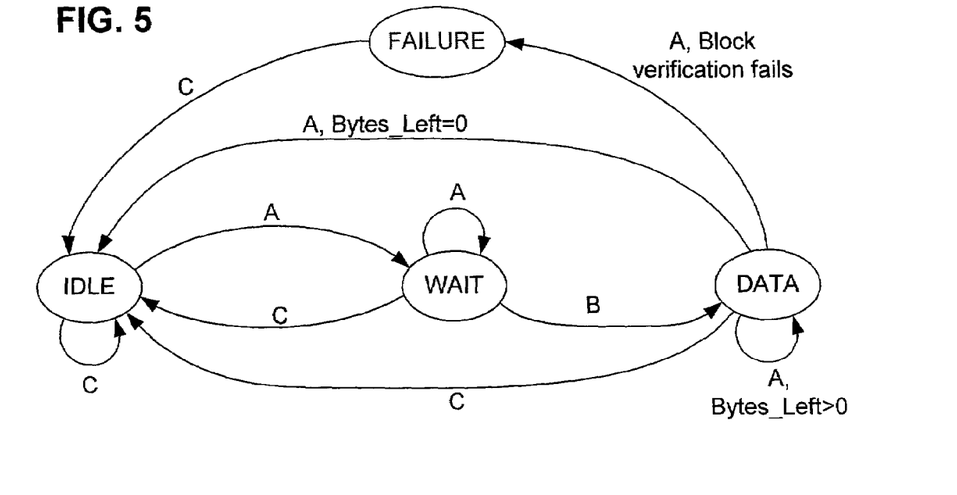
FIG. 5 is a state diagram of the packet buffering mechanism according to the invention.

From the perspective of the VM, the VMM acts as a destination, indeed as all possible destinations. At any given moment, each destination represented (emulated) by the VMM will assume one of several states. FIG. 5 is a state diagram of one VMM destination. As FIG. 5 illustrates, the primary destination states are IDLE, WAIT, DATA and FAILURE.

The main inputs to the VMM in each state are shown as A, B, and C, with the following meanings:

A: A request by the virtual controller for the VMM to process a TD;

B: I/O Complete, that is, notification of completion of command sent to the host interface;

C: Destination Reset, that is, a request to cancel the pending data transfer and reset the target device.

The IDLE state represents no current activity to the destination, that is, no pending request by the VM for the VMM to take any new action relating to transfer to the bus. For the different inputs A, B, C, the VMM in the IDLE state acts as follows:

A: Perform a SCAN/ISSUE operation (see above) on the TD, transition to the WAIT state, and return BUSY as the result.

B: This input will never be received in this state, since no I/O operation has yet been initiated.

C: No action to be taken.

In the WAIT state, data has been sent to the HIF 700 but its transfer to the target device has not yet been completed. It is when in this state that the VMM returns a BUSY result each time the VM attempts to place a packet on the (emulated) bus, all the while actually performing the transaction. Inputs A, B, and C are processed as follows:

A: BUSY is returned to the VM as the result.

B: Transition to the DATA state.

C: Cancel the on-going data transfer and transition to the IDLE state.

The DATA state signifies that the HIF has completed the transfer of data block D*, so that the VMM can simulate the completion of each individual TD by returning to the virtual controller a result indicating successful transfer of each submitted packet. Inputs A, B, and C are processed as follows:

A: Input A may be handled according to the following "pseudo-code", where Bytes_Left is the number of bytes in the buffer 630 that have not yet be transferred OUT or IN, and TD_DataSize is the number of data bytes associated with the TD currently being processed points:

---

```
If Bytes_Left > TD_DataSize
    for IN operations only:
        copy TD_DataSize bytes from buffer 630 to buffer 530
    for OUT operations only:
        perform data block verification; if mismatch then transition to FAILURE state
    for both IN and OUT operations:
        decrement Bytes_Left by TD_DataSize
        return SUCCESS as the result
```

-continued
```
Otherwise
    transition to IDLE state and . . .
        if HIF reports SUCCESS
            for IN operations only:
                copy TD_DataSize bytes from buffer 630 buffer 530
            for OUT operations only:
                perform data block verification; if mismatch then transition to
                FAILURE state
        then
            if Bytes_Left = TD_DataSize, return SUCCESS
            if Bytes_Left > TD_DataSize, return overrun FAILURE result
            if Bytes_Left < TD_DataSize, return underrun FAILURE result
        otherwise, if HIF reported FAILURE, return appropriate FAILURE result
```

B: This input will never be received in this state, since no I/O operation has yet been initiated.

C: Transitioning to the IDLE state.

The FAILURE state signifies that the data consolidation and batch transfer procedure according to the invention has caused the VMM emulation to disagree with the HIF. For example, an OUT command may have issued to the HIF which the guest thinks it never sent, such as could occur if the HIF 700 completes transfer of D* when the guest chooses to cancel the transfer or change the data set D after it receives the Busy signal from the VMM. While it will not always be possible to recover cleanly from this state, the invention preferably includes a mechanism that handles it in such a way that state inconsistency is resolved: The VMM simulates a device disconnection (by returning to the VM a corresponding failure signal), which will in turn induce the VM to issue a request to reset the target device. It should be noted that, in tests of a prototype of the invention, this state has never been observed to have been reached and can therefore be assumed to be very uncommon. Nonetheless, according to this feature of the invention, inputs A, B and C are handled as follows:

A: Return a signal such as NO RESPONSE to indicate device disconnection.

B: This input should never be received in this state.

C: Transition to the IDLE state.

Those skilled in the art of computer programming should at this point understand the premises and extensions of the preferred embodiment of the invention described above. In general, the premises are:

1) at least one source data set D is to be transferred between a transfer-initiating sub-system (such as the VM, in particular, some source process within the VM) and at least one destination over a channel (such as a bus or network);

2) actual transfer of data to and from the channel is done by a host interface, which forms a transfer-executing sub-system in that it executes the request for data transfer;

3) the transfer-initiating sub-system does not output or input data and transfer requests to the host interface directly, but rather via at least one intermediate sub-system (such as the VMM) that acts as an intermediate interface;

4) the transfer-initiating sub-system outputs and inputs data to the intermediate interface in units (such as packets) or blocks that are smaller than the source data set itself. In other words, the original data set is transferred piecewise as a plurality of data sub-sets between the transfer-initiating sub-system and the intermediate interface;

5) I/O to and from the transfer-initiating sub-system is done sequentially, such that the transfer-initiating sub-system delays transfer of at least one data sub-set until it has received confirmation that at least one previously submitted data sub-set has been transferred successfully;

6) I/O to and from the transfer-initiating sub-system can be suspended by the intermediate sub-system without necessarily causing the transfer-initiating sub-system to cancel the entire requested I/O operation, and without affecting the normal execution of the transfer-initiating sub-system in any way other than how it would be affected if the transfer-suspension signal had come directly from the actual channel;

7) data sub-sets can be combined in the intermediate interface without causing any change in the way the target destination (for OUT operations) or the transfer-initiating sub-system (for IN operations) ultimately interprets the transferred data.

These premises allow for a wide range of alternatives to the preferred embodiment without departing from the scope of the invention. Among these extensions and alternatives are:

As is mentioned earlier, the invention will work with other transfer protocols besides USB as long as the protocol allows the invention to meet the premises outlined above. For example, the invention could also be used for other packet-based I/O such as over a network, including the Internet, telephone and data networks, etc., and the transmission channel may be implemented using any medium, such as wires, wireless, optical fibers, etc.

Note that it is not strictly necessary for the VM-to-VMM (or analogous) interface to operate with the same protocol as the host interface-to-channel protocol, as long as there is a well-defined conversion procedure from one protocol to the other, which could be carried out in the VMM. For example, the transfer protocol used by the hardware controller and the destination might allow for larger (or smaller) packets than the virtual controller implemented in the VM. Such an arrangement might allow users to run legacy I/O systems in the VM while still enabling I/O to more modern target destinations.

Using the invention, mixed-protocol transfers could also be implemented in which both the VM and the destination operate according to a first protocol, but the channel is a network that operates according to a second, different protocol. For IN operations, the VMM should therefore include a protocol translation module 695, which may be programmed using known techniques, to convert the data received from the host interface 700 into the form assumed by the virtual controller 540. A corresponding hardware and/or software module should then also be included at the target device for conversion from the channel protocol to whatever protocol the device assumes. Protocol translation (and thus the module 695) may also be included in the case (in particular, for OUT operations) in which the host interface 700 takes data not in block form (D*), but rather using some other data structure or according to some other protocol.

As yet another example of an alternative embodiment, or, rather, use, the invention could be used to enable I/O between a packet-based virtual controller and a high-speed serial bus (or network). The intermediate interface (for example, VMM) could, in such case, create the data block D* and pass it to the host interface for high-speed transfer as a single (or multiple) serial data stream(s). If the transfer is successful, then the intermediate interface could indicate this to the virtual controller by signaling successful transfer of individual packets as in the USB example used above to describe the preferred embodiment of the invention.

The invention is not restricted to use with only two I/O interfaces, although this will be by far the most common case. It would be possible, for example, for yet another interface to exist between the intermediate interface described above and the host interface. This additional interface might, for example, convert the data block D* into some other format that the host interface assumes.

It is not necessary for the system hardware 100 and/or the transmission channel (bus) 450 and/or the destination(s) 400 to be physical (hardware) systems. Rather, any or all of these could themselves be software emulations.

In the description above of the preferred embodiment of the invention, the transfer-initiating sub-system has been assumed to be a virtual machine, and that the virtual machine is under the control of a virtual machine monitor. This is because not only do virtual machines have well-known advantages, such as being functionally isolated from other application-level software and allowing for an additional level of addressing indirection, but also because this was the configuration used successfully in a prototype of the invention.

A virtual machine, is not, however, the only transfer-initiating sub-system that can benefit from the invention. For example, machine simulators, also known as machine emulators, run as application programs on top of an existing operating system. They emulate all the components of a given computer system with enough accuracy to run an operating system and its applications. Such a software sub-system may also be the one that initiates data transfer and thus takes the place of the VM 500. Some intermediate software interface should in such cases be provided to perform the functions of the VMM as described above. In general, as long as the premises listed above are met, the various software modules that implement the unique features of the invention may be designed using known programming methods to perform the same functions as in the preferred VM/VMM-based embodiment.

Note, moreover, that it is not necessary for the transfer-initiating sub-system to be a "software computer" at all. Rather, the invention may also be used in any general system that includes at least one sub-system, whether hardware or software or both, whose data transfer requirements and procedures meet the premises listed above.

We claim:

1. A method for transferring a data set between a transfer-initiating subsystem and a target via an intermediate subsystem, a transfer-executing subsystem, and a channel, where:

the transfer-initiating subsystem follows a transfer protocol in which the data set is transferred as a series of packets, and transfer of at least one subsequent packet is contingent on completed transfer of at least one previous packet;

data transfer between the transfer-initiating subsystem and the transfer-executing subsystem takes place via the intermediate subsystem;

the transfer-executing subsystem initiates data transfer via the channel upon receipt of a transfer request and of identification of the data set to be transferred;

the method comprising:

within the intermediate subsystem,
   A) receiving a first one of the packets from the transfer-initiating subsystem;
   B) signaling to the transfer-initiating subsystem that the transfer of the first packet is still pending, so that the transfer-initiating subsystem at least temporarily delays submission of subsequent packets to the intermediate subsystem;
   C) issuing to the transfer-executing subsystem a transfer request and identifying for the transfer-executing subsystem the data set to be transferred, whereupon the transfer-executing subsystem attempts transfer of the data set;
   D) upon sensing a completion signal from the transfer-executing subsystem indicating completed transfer of the data set,
      i) signaling to the transfer-initiating subsystem completed transfer of the first packet;
      ii) receiving subsequent packets from the transfer-initiating subsystem and, for each, signaling to the transfer-initiating subsystem completed transfer of each subsequent packet.

2. A method as in claim 1, in which:
   A) the direction of transfer of the data set is from the transfer-initiating subsystem to the target; and
   B) the transfer-initiating subsystem stores the data set in a memory space accessible to the intermediate subsystem;
   C) the method further comprising the following steps:
      i) creating, within the intermediate subsystem, and independently of action by the transfer-initiating subsystem, a copy of the data set by accessing the memory space in which the transfer-initiating subsystem has stored the data set; and
      ii) identifying for the transfer-executing subsystem the copy of the data set as the data set to be transferred.

3. A method as in claim 2, in which the transfer-initiating subsystem derives, for the data set stored in the memory space, a plurality of descriptors, each descriptor specifying at least a memory location of a corresponding sub-set of the data set, and in which packets are generated at least partially based on the descriptors, the method further comprising the following step:

in the intermediate subsystem, creating the copy of the data set by evaluating the descriptors.

4. A method as in claim 2, further including the following steps:

in the intermediate subsystem, upon sensing the completion signal from the transfer-executing subsystem, determining whether the transfer-initiating subsystem has changed the data set since the time when the first packet was received and, if so, creating and submitting to the transfer-executing subsystem for transfer to the target a copy of the changed data set.

5. A method as in claim 4, in which the step of determining whether the transfer-initiating subsystem has changed the data set comprises comparing the copy of the data set with a possibly changed data set currently designated for transfer by the transfer-initiating subsystem.

6. A method as in claim 4, in which the transfer-initiating subsystem derives, for the data set stored in the memory space, a plurality of descriptors, each descriptor specifying at least a memory location of a corresponding sub-set of the data set, and in which packets are generated at least partially from the descriptors, the method further comprising the following steps:

storing for access by the intermediate subsystem a copy of the descriptors corresponding to the copy of the data set currently being transferred by the transfer-executing subsystem; and in the intermediate subsystem, determining whether the transfer-initiating subsystem has changed the data set by comparing the descriptors corresponding to the data set currently being transferred by the transfer-executing subsystem with the descriptors of a possibly changed data set currently designated for transfer by the transfer-initiating subsystem.

7. A method as in claim 4, in which:

the transfer-initiating subsystem derives and stores, at respective descriptor memory addresses, a plurality of descriptors, each descriptor identifying a corresponding sub-set of the data set, the method further comprising the following steps:

for each descriptor, creating an outrecord identifying the corresponding descriptor memory address; and determining whether the transfer-initiating subsystem has changed the data set by comparing the descriptor memory addresses identified in each outrecord with the addresses in memory of the descriptors most recently created by the transfer-initiating subsystem for the data set.

8. A method as in claim 1, in which the direction of transfer of the data set is from the target to the transfer-initiating subsystem, the method further comprising the following steps:

A) creating a buffer within the intermediate subsystem;
B) storing in the buffer the data set transferred from the target; and
C) upon completed transfer and storage of the data set, and upon receipt by the intermediate subsystem of each packet from the transfer-initiating subsystem, copying a corresponding portion of the data set to the packet.

9. A method as in claim 8, in which the transfer-initiating subsystem derives, for the data set to be transferred from the target, a plurality of descriptors, each descriptor specifying at least a size of a corresponding subset of the data set to be transferred, the method further comprising creating the buffer as a function of the plurality of descriptors, the size of each portion of the data set copied to its respective packet corresponding to the size of the subset specified by the corresponding descriptor.

10. A method as in claim 1, in which the channel between the transfer-executing subsystem and the target is a first channel, further comprising the steps of emulating a second channel in the intermediate subsystem and directing all packet transfer between the transfer-initiating subsystem and the target to the emulated, second channel.

11. A method as in claim 1, in which the transfer-initiating subsystem is a software-implemented computer.

12. A method as in claim 11, in which the transfer-initiating subsystem is a virtual machine.

13. A method as in claim 1, in which:

the channel is a Universal Serial Bus (USB);
the target is a USB device and respective pipe; and both the transfer-initiating subsystem and the transfer-executing subsystem generate and transfer packets according to the USB protocol.

14. A method as in claim 1, further comprising the step of transferring data between the transfer-executing subsystem and the target according to a different protocol than the transfer protocol that the transfer-initiating subsystem follows.

15. A method for transferring a data set between a virtual machine and a target via a virtual machine monitor, a host interface, and a channel, where:

the virtual machine follows a transfer protocol in which the data set is transferred as a series of packets, and transfer of at least one subsequent packet is contingent on completed transfer of at least one previous packet;

data transfer between the virtual machine and the host interface takes place via the virtual machine monitor;

the host interface initiates data transfer via the channel upon receipt of a transfer request and of identification of the data set to be transferred, and of identification of the target;

the method comprising:

within the virtual machine monitor,

A) receiving a first one of the packets from the virtual machine;

B) signaling to the virtual machine that the transfer of the first packet is still pending, so that the virtual machine at least temporarily delays submission of subsequent packets to the virtual machine monitor;

C) issuing to the host interface a transfer request and identifying for the host interface the data set to be transferred, whereupon the host interface attempts transfer of the data set;

D) upon sensing a completion signal from the host interface indicating completed transfer of the data set, i) signaling to the virtual machine completed transfer of the first packet;

ii) receiving subsequent packets from the virtual machine and, for each, signaling to the virtual machine completed transfer of each subsequent packet.

16. A method as in claim 15, in which:

A) the direction of transfer of the data set is from the virtual machine to the target; and B) the virtual machine stores the data set in a memory space accessible to the virtual machine monitor;

C) the method further comprising the following steps:

i) creating, within the virtual machine monitor, and independently of action by the virtual machine, a copy of the data set by accessing the memory space in which the virtual machine has stored the data set; and ii) identifying for the host interface the copy of the data set as the data set to be transferred.

17. A method as in claim 16, in which the virtual machine derives, for the data set stored in the memory space, a plurality of descriptors, each descriptor specifying at least a memory location of a corresponding sub-set of the data set, and in which packets are generated at least partially based on the descriptors, the method further comprising the following step:

in the virtual machine monitor, creating the copy of the data set by evaluating the descriptors.

18. A method as in claim 16, further including the following steps:

in the virtual machine monitor, upon sensing the completion signal from the host interface, determining whether the virtual machine has changed the data set since the time when the first packet was received and, if so, creating and submitting to the host interface for transfer to the target a copy of the changed data set.

19. A method as in claim 18, in which the step of determining whether the virtual machine has changed the data set comprises comparing the copy of the data set with a possibly changed data set currently designated for transfer by the virtual machine.

20. A method as in claim 18, in which the virtual machine derives, for the data set stored in the memory space, a plurality of descriptors, each descriptor specifying at least a memory location of a corresponding sub-set of the data set, and in which packets are generated at least partially from the descriptors, the method further comprising the following steps:

storing for access by the virtual machine monitor a copy of the descriptors corresponding to the copy of the data set currently being transferred by the host interface; and in the virtual machine monitor, determining whether the virtual machine has changed the data set by comparing the descriptors corresponding to the data set currently being transferred by the host interface copy with the descriptors of a possibly changed data set currently designated for transfer by the virtual machine.

21. A method as in claim 15, in which the direction of transfer of the data set is from the target to virtual machine, the method further comprising the following steps:

A) creating a buffer within the virtual machine monitor;
B) storing in the buffer the data set transferred from the target; and
C) upon completed transfer and storage of the data set, and upon receipt by the virtual machine monitor of each packet from the virtual machine, copying a corresponding portion of the data set to the packet.

22. A method as in claim 21, in which the virtual machine derives, for the data set to be transferred from the target, a plurality of descriptors, each descriptor specifying at least a size of a corresponding subset of the data set to be transferred, the method further comprising creating the buffer as a function of the plurality of descriptors, the size of each portion of the data set copied to its respective packet corresponding to the size of the subset specified by the corresponding descriptor.

23. A method as in claim 15, in which the channel between the host interface and the target is a first channel, further comprising the steps of emulating a second channel in the virtual machine monitor and directing all packet transfer between the virtual machine and the target to the emulated, second channel.

24. A method as in claim 15, in which:
the channel is a Universal Serial Bus (USB);
the target is a USB device and respective pipe; and
both the virtual machine and the host interface generate and transfer packets according to the USB protocol.

25. A method for transferring a data set from a transfer-initiating subsystem to a target via an intermediate subsystem, a transfer-executing subsystem, and a channel, where:

A) the transfer-initiating subsystem
  i) stores the data set in a memory space accessible to the intermediate subsystem;
  ii) derives, for the data set stored in the memory space, a plurality of descriptors, each descriptor specifying at least a memory location of a corresponding sub-set of the data set;
  iii) follows a transfer protocol in which the data set is transferred as a series of packets;
  iv) generates the packets at least partially based on the descriptors; and
  v) transfers at least one subsequent packet contingent on completed transfer of at least one previous packet;
B) data transfer from the transfer-initiating subsystem to the transfer-executing subsystem takes place via the intermediate subsystem;
C) the transfer-executing subsystem initiates data transfer via the channel upon receipt of a transfer request and of identification of the data set to be transferred;

the method comprising:
D) within the intermediate subsystem,
  i) creating, independently of action by the transfer-initiating subsystem, a copy of the data set by evaluating the descriptors and by accessing the memory space in which the transfer-initiating subsystem has stored the data set; and
  ii) identifying for the transfer-executing subsystem the copy of the data set as the data set to be transferred and issuing the transfer request to the transfer-executing subsystem;
  iii) receiving a first one of the packets from the transfer-initiating subsystem;
  iv) signaling to the transfer-initiating subsystem that the transfer of the first packet is still pending, so that the transfer-initiating subsystem at least temporarily delays submission of subsequent packets to the intermediate subsystem;
  v) issuing to the transfer-executing subsystem a transfer request and identifying for the transfer-executing subsystem the data set to be transferred, whereupon the transfer-executing subsystem attempts transfer of the data set to the target; and
  vi) upon sensing a completion signal from the transfer-executing subsystem indicating completed transfer of the data set,
    a) signaling to the transfer-initiating subsystem completed transfer of the first packet; and
    b) receiving subsequent packets from the transfer-initiating subsystem and, for each, signaling to the transfer-initiating subsystem completed transfer of each subsequent packet.

26. A system for transferring a data set between a transfer-initiating subsystem and a target via a transfer-executing subsystem and over a channel, where:

A) the transfer-initiating subsystem follows a transfer protocol in which the data set is transferred as a series of packets, and transfer of at least one subsequent packet is contingent on completed transfer of at least one previous packet;
B) the transfer-executing subsystem initiates data transfer via the channel upon receipt of a transfer request and of identification of the data set to be transferred;

the system comprising:
C) an intermediate subsystem
  i) forming an interface between the transfer-initiating subsystem and the transfer-executing subsystem,
  ii) forming means for identifying for the transfer-executing subsystem the data set to be transferred, whereupon the transfer-executing subsystem attempts transfer of the data set;

iii) and including:
  a) an emulated channel forming means for receiving the packets from the transfer-initiating subsystem and for signaling to the transfer-initiating subsystem that the transfer of a first packet is still pending, so that the transfer-initiating subsystem at least temporarily delays submission of subsequent packets to the intermediate subsystem;
  b) transfer management means for issuing to the transfer-executing subsystem a transfer request and for receiving a completion signal from the transfer-executing subsystem indicating completed transfer of the data set;
D) the emulated channel being further provided, upon receipt by the transfer management means of the completion signal,
  i) for signaling to the transfer-initiating subsystem completed transfer of the first packet; and
  ii) for receiving subsequent packets from the transfer-initiating subsystem and, for each, for signaling to the transfer-initiating subsystem completed transfer of each subsequent packet.

27. A system as in claim 26, in which the direction of transfer of the data set is from the transfer-initiating subsystem to the target; and the transfer-initiating subsystem stores the data set in a memory space accessible to the intermediate subsystem, the system further comprising:
  consolidation means, within the intermediate subsystem, for creating a copy of the data set, independent of action by the transfer-initiating subsystem, by accessing the memory space in which the transfer-initiating subsystem has stored the data set; and for identifying for the transfer-executing subsystem the copy of the data set as the data set to be transferred.

28. A system as in claim 27, further comprising verification means for determining whether the transfer-initiating subsystem has changed the data set from the time when a first packet but before completion of the transfer by the transfer-executing subsystem and, if so, for creating and submitting to the transfer-executing subsystem for transfer to the target a copy of the changed data set.

29. A system as in claim 26, in which the direction of transfer of the data set is from the target to the transfer-initiating subsystem, the system further comprising:
  a buffer within the intermediate subsystem for storage of the data set transferred from the target; and
  consolidation means within the intermediate subsystem for copying a corresponding portion of the data set to a respective one of the packets issued by the transfer-initiating subsystem upon completed transfer of the data set from the target.

30. A system as in claim 26, in which the transfer-initiating subsystem is a software-implemented computer.

31. A system as in claim 30, in which the transfer-initiating subsystem is a virtual machine.

32. A system as in claim 26, in which:
the channel is a Universal Serial Bus (USB);
the target is a USB device and respective pipe; and
both the transfer-initiating subsystem and the transfer-executing subsystem generate and transfer packets according to the USB protocol.

* * * * *

UNITED STATES PATENT AND TRADEMARK OFFICE
CERTIFICATE OF CORRECTION

PATENT NO. : 7,111,086 B1 Page 1 of 1
APPLICATION NO. : 10/080782
DATED : September 19, 2006
INVENTOR(S) : Matthew Eccleston and Bich Cau Le It is certified that error appears in the above-identified patent and that said Letters Patent is hereby corrected as shown below:

1. Title page item (12) & item (75) Inventors, change

"Ecoleston"

to

--Eccleston--

Signed and Sealed this

Third Day of November, 2009

David J. Kappos
*Director of the United States Patent and Trademark Office*